United States Patent [19]
Kepner

[11] Patent Number: 5,739,903
[45] Date of Patent: Apr. 14, 1998

[54] HOUSEHOLD VESSEL CONTAINING A RADIOMETER WITHIN VESSELS STRUCTURE

[76] Inventor: Erl E. Kepner, 256 Blue Ridge Dr., Boulder Creek, Calif. 95006

[21] Appl. No.: 815,368
[22] Filed: Mar. 10, 1997
[51] Int. Cl.$^6$ .................................................. B65D 77/00
[52] U.S. Cl. .............................. 356/216; 206/217; D7/507
[58] Field of Search ............................. 356/216; D7/507, D7/509; 206/217; 446/71

[56] References Cited

U.S. PATENT DOCUMENTS

| | | | |
|---|---|---|---|
| 182,172 | 9/1876 | Crookes | 356/216 |
| 2,102,164 | 12/1937 | Payson et al. | 220/15 |
| 3,077,286 | 2/1963 | Cornelius | 220/94 |
| 3,742,174 | 6/1973 | Hamden, Jr. | 219/10.49 |
| 4,112,707 | 9/1978 | Joseph | 63/31 |
| 4,315,430 | 2/1982 | Szonntagh | 73/190 CV |
| 4,410,805 | 10/1983 | Berley | 290/1 R |
| 4,726,688 | 2/1988 | Ruel | 374/29 |
| 4,926,037 | 5/1990 | Martin-Lopez | 250/205 |
| 5,029,700 | 7/1991 | Chen | 206/217 |
| 5,553,735 | 9/1996 | Kimura | 220/469 |

FOREIGN PATENT DOCUMENTS

| | | |
|---|---|---|
| 3320-249-A1 | 12/1984 | Germany . |
| 2 210 294 | 6/1989 | United Kingdom . |

*Primary Examiner*—Richard A. Rosenberger

[57] ABSTRACT

A vessel (20) is fabricated with a separate evacuated hollow volume (26) in the side wall (22) and bottom (24) of the vessel (20) that allows for the insertion of a paddlewheel radiometer in the evacuated space. The bottom (24) and side wall (22) of the vessel (20) are made so that selected portions are transparent thus the paddlewheel radiometer assembly (28) portion of the radiometer can receive light energy and be observed to spin when the vessel (20) is exposed to a light source. The assembly (28) rotates on a hub located along the central axis of the vessel (20) in the center of the of the evacuated hollow volume (26). The rotating assembly (28) includes perpendicular vanes (30) that radiate outward along the radius of the vessel (20). Each of the vanes (30) is blackened on one side and mirrored or white on the other side. The assembly (28) is constructed so that it balances horizontally at its center hub. The vanes (30) are arranged so that they each have their black light absorbing surface (32) facing the same way when the assembly (28) rotates. With very low gas pressure in the evacuated hollow volume (26), the radiant energy from an external light or heat source, will cause the vane assembly (28) to turn due to the different thermal properties of the black and mirrored or white surfaces of the vanes (30) and the differing rebounding energies of the rare gas molecules in the evacuated hollow volume (26) imparting a torque to the vanes (30) which spins the radiometer assembly (28) at a substantial rate.

20 Claims, 5 Drawing Sheets

View 2 - 2

Fig. 2

View 2 - 2

HOUSEHOLD VESSEL CONTAINING A RADIOMETER WITHIN VESSELS STRUCTURE

BACKGROUND

1. Field of Invention

This invention relates to making household vessels, such as cups, vases or dewars, that contain a paddlewheel radiometer within a vessels structure, specifically to have the radiometer exhibit mechanical motion when placed in a lighted environment without the need of a motor power source such as a battery or solar cell.

2. Description of Prior Art

The use of household vessels to contain our food and beverage as well as to be used for storage and display of possessions dates back to antiquity and there are billions of these vessels in use world wide. The use of a radiometer to detect, measure and evaluate electromagnetic radiation dates back to the middle 1800's. This invention combines the two items; a household vessel and a radiometer, in a household vessel that that includes a paddlewheel type radiometer internal to the side wall and bottom of a vessel. Although there are patents that relate to both vessels and radiometers there are none that use both in combination.

Radiometers are devices that are primarily used by scientists and engineers to detect and evaluate electromagnetic radiation. Radiometers are used as sensors or detectors in apparatuses to maintain proper orientation for earth orbiting satellites, to help maintain the aim of telescopes on distant objects in space and for numerous aiming and sensor devices that are used in manufacturing. Most radiometer applications use solid state radiometer devices and do not have any moving component. The radiometer used in this invention utilizes a paddle wheel type of shape and rotates in a horizontal plane.

The use of a Crookes type paddle wheel radiometer for the purpose of teaching or demonstrating the principles of thermodynamics and radiation has been in place for over a century. There has been; however, a rather limited exposure of this type of instrument to the general public. There has been no attempt to utilize its principles of operation in any common everyday household product for either educational or novelty purposes. Neither has there been any substantial effort to use the operation of such a radiometer as a component of a common household object, as an item of useful purpose with a substantial novelty and conversational curiosity, for advertising or for use as a marketing tool.

One of the patents; U.S. Pat. No. 5,553,735, describes a container that utilizes a double wall and displays decoration, information or electrical mechanical devices between its wall but does not contain a vacuum or a radiometer. There is radiometer jewelry (U.S. Pat. No. 4,112,707) but it is not formed as a household vessel such as a coffee mug, vase or dewar. Additionally the radiometer jewelry of U.S. Pat. No. 4,112,707, as described in the patent, appears to be very difficult to assemble and to seal after a vacuum has been drawn on its internal volume. This is partly due to the small size and necessarily tight dimensional tolerances of the items of jewelry, ear rings, necklaces, pendants, broaches etceteras, but more so due to the lack of a suitable way to mount the rotating portion of the radiometer within the jewelry so that its frictional energy losses will not stop it from spinning when used as intended. The small size of the jewelry items to be fabricated and their random orientation during normal use also require more energy to cause the radiometer to spin. A way to reduce the energy required to spin these radiometers contained in jewelry is to reduce the mass of the portion of the radiometer that spins and to reduce the frictional losses at the point or points of support of the spinning portion of the radiometer. This can only be accomplished to certain limits and the small size of the jewelry precludes scaling the size and frictional losses down to reasonable levels.

Because this invention requires an evacuated space and includes a radiometer internal to its structure, it does not infringe on U.S. Pat. No. 5,553,735, which is still in force. The vessel described in U.S. Pat. No. 5,553,735 does not include any movement as an attraction or any method for attracting attention to the vessel other than its colors or decoration.

U.S. Pat. Nos. 3,077,286 and 2,102,164 do include vessels that have a double wall however they neither include a radiometer or a vacuum in the hollow wall. Other patents that relate to radiometers, such as; U.S. Pat. Nos. 4,410,805, 4,926,037, 4,726,688 and 4,315,430 are scientific application specific devices and do not relate to household vessels or consumer applications.

A combination of the two component parts of the invention is not obvious as is evidenced by the period of more than a century that has gone by since the invention and parenting of the radiometer by Sir William Crooks of Great Britain and the lack of combination of the paddle wheel radiometer and a household vessel. The lack of appreciation for the possibility of including a paddle wheel type of radiometer in a household vessel is partially due to the fact that the use of the household vessel is so ubiquitous that it just was not believed to have many new possible refinements or improvements. Also, it is likely that the references to the prior use of radiometers due not include the use of a household vessel and a radiometer in combination because the two items were designed or developed by people in very separate fields. A designer of new household vessels was typically not exposed to radiometers and a person working with radiometers was typically not interested in designing household vessels.

OBJECTS AND ADVANTAGES

Accordingly, besides the objects and advantages of the vessel with radiometer enclosed in its structure, described in this patent, several additional objects and advantages of the present invention are:

(a) to provide a commonly available product for demonstration of easily observed thermodynamic properties of gasses and surfaces that will, to varying degrees, provide education and stimulation to old and young alike;

(b) to provide a tool that can be used in marketing and advertising a product or service by having information relating to the product or service emblazoned on the vessel or radiometer assembly;

(c) to provide an item intended to facilitate conversation such as other conversation pieces like a coffee table book or a table centerpiece;

(d) to provide a decorative and aesthetic focus for an otherwise inanimate room or area that is subtle enough to not become a distraction over time;

(e) to provide a longer period of retaining the temperature of the vessels contents, when used as a dewar for food or beverage, than a typical cup or container due to the evacuated hollow volume in the vessels structure;

(f) to provide an item of contemplation and focus, similar to the effect of a flickering fireplace, that can be used to help produce a quiet and contemplative mood for reflection and introspection;

(g) to provide a tool that can be used for the promotion or remembrance of an event and as a piece of memorabilia to commemorate that event and can be set aside as bricabrac or a curio on a shelf or display area in a home;

(h) to provide a new variety of household vessel for consumers to select from when they purchase a container for themselves or when they purchase a gift for others;

(i) to provide a object of curiosity within a common household vessel for intellectual stimulus of all those who witness the operation of the paddle wheel radiometer within the structure of the vessel;

(j) to provide a new product; vessel with paddle wheel radiometer, which can gain a very small market share of a very huge market; hundreds of millions of household vessels sold annually, therefore employing people and providing a new "value added" type of product for the consumer;

(k) to provide a set of products that can tie in with certain specialized portions of the market such as using the invention in vases sold by florists or coffee mugs sold by coffee manufacturers or retail coffee shop;

(l) to provide a product that can support a manufacturing business that is very long term in character and will likely be providing the vessel with paddle wheel radiometer type of product long after this patent has expired and well into the next century;

(m) to provide a product that is technical in nature yet does not require huge investment in order to set up a production facility;

(n) to provide a dynamic product for the consumer for which there presently is no viable alternative and therefore offer a greater range of choice to the consumer for the purchase of the wide variety of household vessels that are purchased by the consumer;

(o) to provide a product that can be manufactured with the minimal detrimental effect on the environment and with far fewer pollution products than any presently conceivable type of household vessel that would contain a moving object within its structure; i.e., such as vessel with an electric motor powered by electricity from solar cells;

(p) to provide a product that can be manufactured in a very environmentally and pollution sensitive area that has no sewage or waste infrastructure;

(q) to provide a very long lasting, highly reliable dynamic product that is dramatically superior to the possible alternatives; such as a vessel with an electric motor powered by electricity from solar cells, as far as both life time and reliability. The fact that only one contiguous part of the vessel with radiometer moves; the vane assembly and central support hub, gives strong support for the long term reliability of the product due to the small number of moving parts and the minimal masses involved in the areas of friction;

(r) to provide a business that can be sustained in a rural and infrastructure limited environment that can provide jobs and equity opportunities;

(s) to provide the consumer with a additional range of choices when purchasing a gift for friends or relatives. The present range of reasonably priced gifts that are available, functional, and non-gender specific as well as aesthetically pleasing, is very limited;

(t) to provide the consumer with an object that performs the usual function of a household vessel while being able to provide an eye catching attention directing movement; i.e. to subtlety attract visitor attention to flowers when housed in a vase that contains a paddle wheel radiometer in its structure;

(u) to provide a product and design that is simple compared to alternative choices for consumer use for a paddlewheel radiometer in an object and involves only normal assembly rigor and equipment. The size of the vessel allows for use of reduced tolerances and more available assembly and manufacturing techniques than a jewelry type of assembly, for example. The simplicity of assembly of readily available component parts also makes the manufacture of the invention more likely because there is no huge investment required to set up a production facility;

(v) to provide animation to an already artificially illuminated item that was specifically intended to be viewed for pleasure such as; a fish bowl or a bird cage by the addition of a hob containing a radiometer in the fish bowl or a radiometer in the water or food dispenser in the bird cage; and, (w) to provide a new variety of items for export from the United States to foreign markets.

Further objects and advantages are to provide a general expansion of choice, relative to the presently available varieties of household vessels and containers, for the benefit of the family and individual. Still further objects and advantages will become apparent from consideration of the ensuing description and drawings.

| Reference Numerals in Drawings | |
|---|---|
| 20 vessel | 22 side wall |
| 24 bottom | 26 evacuated hollow volume |
| 28 assembly | 30 vanes |
| 32 light absorbing surface | 34 light reflective surface |
| 36 handles | 38 cup bearing |
| 40 axial shaft | 42 spindle |
| 44 bottom dimple | 46 top dimple |
| 48 bearing | 50 shell |
| 52 cover | 54 carrying handle |
| 56 spokes | |

SUMMARY

A utilitarian household vessel that contains a paddlewheel type spinning radiometer within its structure so that it will provide animation when light shines on it during its otherwise normal usage.

Figure 1:
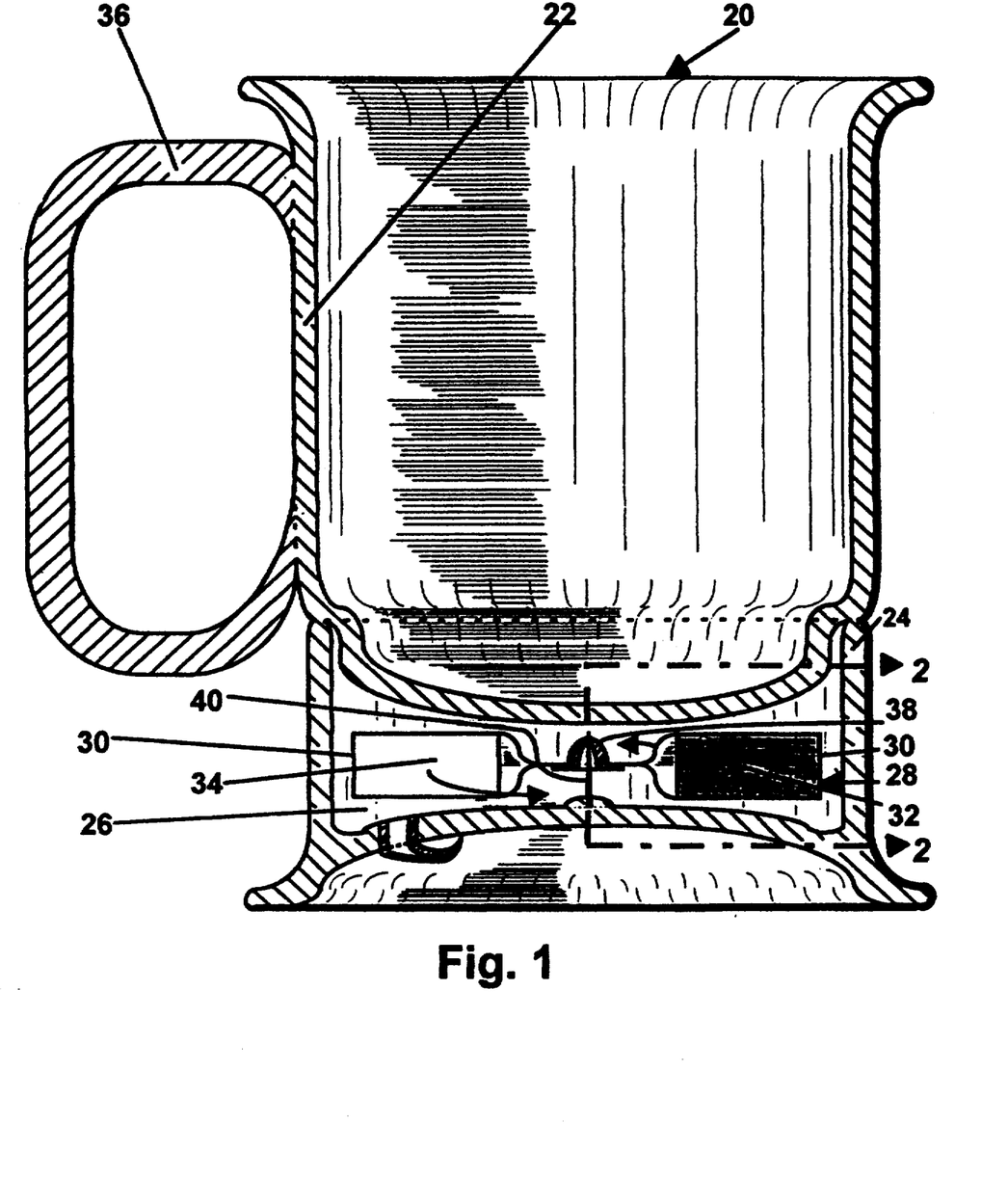
FIG. 1 shows a cross-sectional view of a coffee cup with a radiometer included within an evacuated hollow volume in its bottom.
Figure 2:
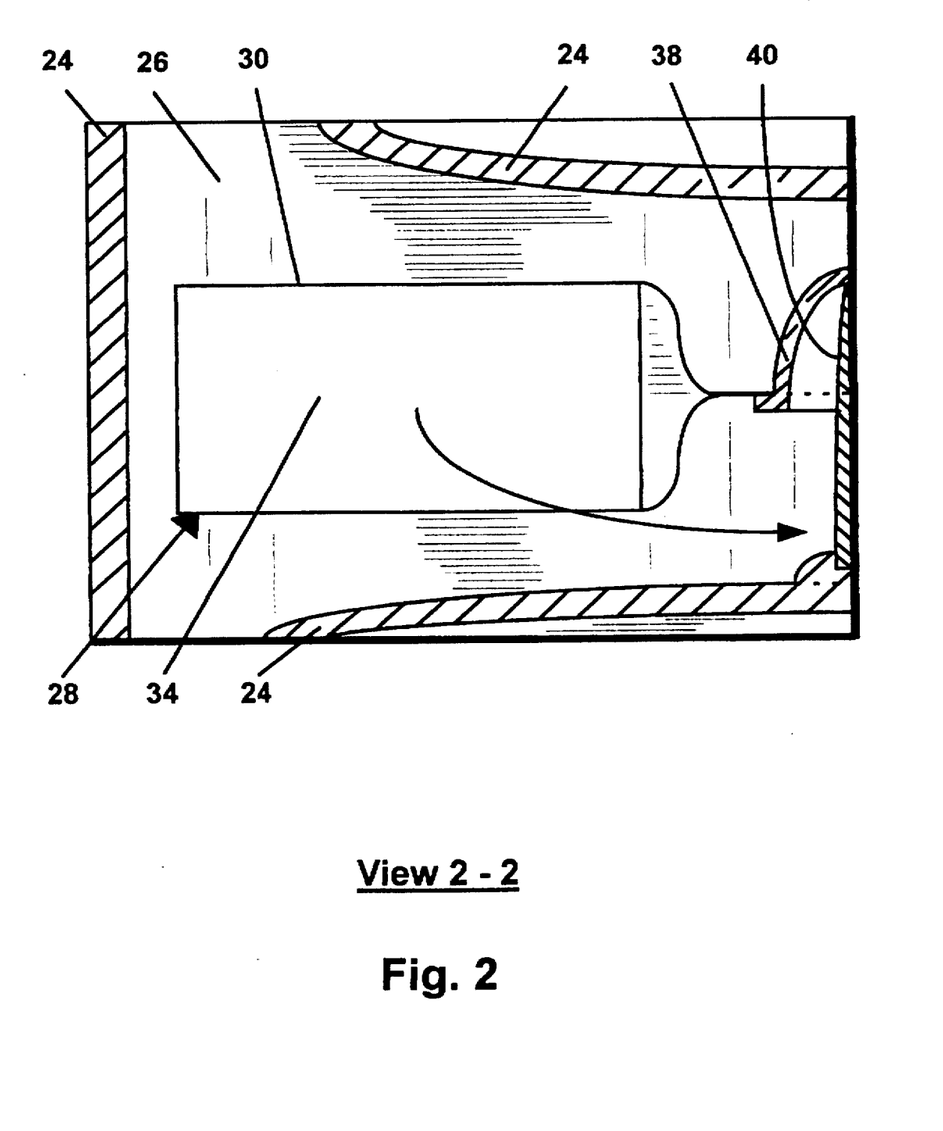
FIG. 2 is a more detailed cross sectional view of the central part of bottom portion of the coffee cup of FIG. 1, indicated by view lines 2—2, showing a portion of the radiometer assembly that includes a cup bearing as the hub for the assembly, in its axial center.

Description—FIGS. 1 and 2

A typical embodiment of a vessel 20 with paddlewheel radiometer, of the present invention is illustrated in FIG. 1

(cross section side view) along with a more detailed illustration of the lower portion of a vessel 20 in FIG. 2 (detailed cross sectional view). The two principle items in this embodiment are a vessel 20 and the radiometer. The vessel 20 of FIGS. 1 and 2 consists of a side wall 22 joined to a bottom 24 that perform the normal function of containing the material that one is using a vessel 20 to hold; such as coffee or tea in the embodiment of FIGS. 1 and 2. A vessel 20 has a side wall 22 to restrain a vessel 20 contents horizontally and a bottom 24 to restrain a vessel 20 contents from leaking out of a vessel 20 vertically downward. In addition to the normal function of a side wall 22 and bottom 24 the vessel 20 has an evacuated hollow volume 26 within the structure of the vessel 20 bottom 24 and side wall 22. A paddlewheel radiometer is centrally located in a evacuated hollow volume 26 within the structure bottom 24 and side wall 22 of a vessel 20. A evacuated hollow volume 26 had been subjected to a vacuum prior to being sealed and contains only rarefied gas. A vessel 20 side wall 22 and bottom 24 are transparent to light in the areas where light must penetrate in order to shine on the vanes 30 of the radiometer. A assembly 28 of the paddlewheel radiometer is horizontally balanced on a central hub along the central axis of a vessel 20 and spins when light shines onto the vanes 30 of the paddlewheel radiometer.

In the embodiment shown in FIGS. 1 and 2, a side wall 22 and bottom 24 of a vessel 20 are made from transparent glass however other transparent materials with low vapor pressure and low out-gassing characteristics can be utilized. The low vapor pressure and low out-gassing requirements are needed so that a evacuated hollow volume 26 will be able to maintain the condition of being largely evacuated of gas throughout the lifetime of a vessel 20. A side wall 22 and bottom 24 of a vessel 20 are made of transparent materials in the areas where light would need to shine through a vessel 20 structure in order to shine on the vanes 30 of a paddlewheel radiometer assembly 28. A vessel 20 overall shape must be consistent with the need for the paddlewheel radiometer assembly 28 to rotate in the evacuated hollow volume 26 of the vessel. This requires that the vessel 20 side wall 22 is cylindrically shaped and that it is radially joined with a coin shaped hollow volume in a bottom 24 of a vessel 20. If the vanes 30 of a assembly 28 are not intended to extend above the uppermost surface of the coin shaped hollow volume, a side wall 22 of a vessel 20 would not need to include a hollow volume. Handles 36 are provided on the outside of a vessel 20 walls to facilitate handling a vessel 20.

The bottom 24 and side wall 22 of the vessel 20 in FIGS. 1 and 2, are made by molding the two mating component parts of a vessel 20 so that they provide the space required for a evacuated hollow volume 26 when the parts are joined. The design of the two component parts of a vessel 20 includes an opening to what will become a evacuated hollow volume 26 for easy installation of a paddlewheel radiometer assembly 28 and its axial mount, prior to the two component parts of a vessel 20 being permanently joined.

The preferred method for producing the vessel 20, shown in FIGS. 1 and 2, side wall 22 and bottom 24 is to use the pressed glass process for molding a vessel 20 component parts. Glass blowing can produce similar pieces and if plastic is used in place of glass, a vessel 20 parts can be made using the plastic injection molding process. Handles 36 can be made at the same time that a vessel 20 side wall 22 is made if the pressed glass process or the plastic injection molding process is used and the handles 36 can be added at a later time if the glass vessel 20 is made using the glass blowing process.

A vessel 20, illustrated in FIGS. 1 and 2, side wall 22 and bottom 24 is assembled from two component parts. A vessel 20 lower component part includes the portion of a vessel 20 below a evacuated hollow volume 26 and a lower portion of a vessel 20 outer coaxial side wall 22 (a lower portion of a side wall 22 radially outside a evacuated hollow volume 26). A vessel 20 upper component part includes; the portion of a vessel 20 structure above the coin shaped evacuated hollow volume 26; the remainder of a vessel 20 outer coaxial side wall 22 (a portion of a side wall 22 radially outside a evacuated hollow volume 26), and; all of the inner coaxial side wall 22 (the portion of a side wall 22 that is towards a vessel 20 central axis from a evacuated hollow volume 26). Each of these two component parts of a vessel 20 are designed so that they can be joined along a single seam along a common circumference on the outside of a vessel 20. With this two component part vessel 20 design approach, the opening required to install all the paddlewheel radiometer hardware is provided by having the entire volume that houses the paddlewheel radiometer open. Only one permanent hermetic attachment around the circumference is required to join the two component parts and produce a complete vessel 20.

The preferred method for joining the two vessel 20 parts after the insertion of the components required for the radiometer, is to melt the parts together using a gas flame if the parts are made from glass or to sonically weld them together if the parts are made of plastic. Other techniques for permanently joining the two vessel 20 component parts, such as the use of high frequency electromagnetic fields or epoxy could be used.

Prior to the completion of the fabrication of a vessel 20 containing a paddlewheel radiometer in a hollow volume within its bottom 24 and side wall 22, it is necessary to evacuate the majority of the atmospheric gas from the space around the paddlewheel radiometer assembly 28 so that the hollow volume will become a evacuated hollow volume 26 required for a assembly 28 to be able to spin when light shines on its vanes 30. In order to accomplish the removal of most of the atmospheric gas, a vent tube is included in the undermost section of a vessel 20 so that the gas can be withdrawn from the radiometer hollow volume. In FIGS. 1 and 2 the remnants of the vent tube required to facilitate removal of the atmospheric gasses is shown but not referred to by a part number because of its obvious purpose. After a vacuum has been obtained in a evacuated hollow volume 26 the vent tube is melted and crushed thus permanently sealing the atmospheric gasses outside a evacuated hollow volume 26 when the vent tube hardens.

The vessel 20, of FIGS. 1 and 2, coaxial center portion may be made from materials that are not transparent to light. The coaxial center portion of a vessel 20 structure is that portion radially inside a evacuated hollow volume 26 of a side wall 22. Likewise the portion of a vessel 20 radially inside a evacuated hollow volume 26 of a side wall 22 may be painted or decorated with non transparent materials. The undermost outer surface of a vessel 20 bottom 24 can also be made from or covered with non transparent materials. A portion of a vessel 20 that is axially outside a evacuated hollow volume 26 may be made from non transparent materials or painted or decorated with non transparent materials however the overall vessel 20 design must allow for sufficient light to shine on the vanes 30 of a assembly 28 or a assembly 28 will not turn. Radiant energy: light or heat, shinning on the vanes 30 from outside a vessel 20 is required for a assembly 28 to rotate. In the embodiment of FIGS. 1 and 2, the vessel 20 is completely made of transparent glass.

A paddlewheel radiometer assembly 28 consists of vanes 30 that are mounted to a central hub or vanes 30 on spokes 56 that are mounted to a central hub. A assembly 28 may not require separate spokes 56 because the vanes 30 themselves may be designed such that they provide the function of a spoke 56 or the vanes 30 may not require spokes 56 due to the design of the particular vessel 20. A number of vanes 30 are contained in a assembly 28 with the vanes 30 radiating outward from the central axis of a vessel 20. The vanes 30 have a black light absorbing surface 32 on one side and a white or mirrored light reflective surface 34 on the other side. The vanes 30 are arranged so that each have their light absorbing surface 32 facing the same rotational direction. The vanes 30 surfaces are in line with a radius of a vessel 20 and parallel with the central axis of a vessel 20. In the embodiment shown in FIGS. 1 and 2, a cup bearing 38 is provided to act as the hub for a assembly 28 and to provide the area for attaching to and supporting a assembly 20 as it rotates. A axial shaft 40 for centrally supporting the mass of a assembly 28 and cup bearing 38 along the central axis of the vessel 20 is provided so that a assembly 28 can turn freely when light shines on it.

In the embodiment shown in FIGS. 1 and 2 the vanes 30 of a assembly 28 are made from thin, light, stiff, sheet aluminum alloy. The sheet of aluminum is coated on one side with a light absorbent black layer and on the other with a white light reflective layer. The black and white or mirrored coatings must have very low out-gassing characteristics and have the appropriate light absorbing and light reflecting parameters. Other sufficiently stiff, strong and light materials may be used for vanes 30 and their construction is not limited to the use of aluminum or any other metal or metal alloy.

The sheet of aluminum is cut into rectangular pieces and a hole is punched in the center of each rectangular piece so that the piece will form a press-fit attachment to a cup bearing 38 later on in the manufacturing process. The rectangular piece is approximately 7.62 centimeters (three inches) by 1.016 centimeters (four tenths of an inch) in size and approximately 0.005 centimeters (two thousandths of an inch) thick. The size and shape stated for the rectangular piece is provided as an aid for envisioning the assembly process and the intent is not to limit the size or shape of the vanes 30 or assemblies 28 by this example. One end section of the rectangular piece is then given a ninety degree half twist in one angular direction, while holding its center section in place, and then other end is given a similar half twist. This results in the rectangular piece having the center section, the area around the hole, being horizontal while both end sections are vertical. The metal is bent to that the black sides of the vanes 30 face the same angular direction when metal piece is rotated about the axis of the hole in its center. One of these rectangular pieces provides a pair of vanes 30 as well as the interconnection structure between the vanes 30 and a cup bearing 38. When two or more of these bent rectangular pieces are locked together symmetrically around the holes in their centers, a assembly 28 for the paddlewheel radiometer is formed. When a assembly 28 is rotated about the common hole of the formed rectangular vane pairs, all the black sides of the vanes 30 face the same angular direction.

In the embodiment illustrated in FIGS. 1 and 2, a assembly 28 is axially mounted on an upside-down cup shaped bearing that balances on a pointed axial shaft 40. A cup bearing 38 is internally shaped so that the inner surface of the cup tapers concentrically to a small radius so that a axial shaft 40 is centered in a cup bearing 38 by the downward force of gravity. A cup bearing 38 and a assembly 28 are concentric with a axial shaft 40 along the central axis of a vessel 20. The vanes 30 are attached either to a cup bearing 38 or to a annular collar or a radial extension on a cup bearing 38 so that they fan outward radially from the center of a cup bearing 38 towards the outer edge of a evacuated hollow volume 26 within a vessel 20.

In the embodiment of FIGS. 1 and 2, a assembly 28 is constructed from two formed rectangular pieces and separate spokes 56 are not required to attach the vanes 30 to a cup bearing 38 hub. A assembly 28 is constructed so that it balances horizontally as a cup bearing 38 lightly rests on a axial shaft 40 which is mounted in a vertical orientation on the bottom of a evacuated hollow volume 26 along the central axis of a vessel 20. The components of a assembly 28 are made as light as possible so that the friction between a cup bearing 38 and a axial shaft 40 is as small as possible.

A cup bearing 38 is made from durable low friction material such as glass but it may be made from metal or some other material with a low friction coefficient and a cup bearing 38 can include a low function insert center mount such as a jewel. A cup bearing 38 should be designed so that the distance between the center of gravity of a assembly 28 and the point where a cup bearing 38 rests on a axial shaft 40 is maximized. This allows for the greatest stability when a assembly 28 rotates. Additional weight added at the bottom of a cup bearing 38 helps to stabilize the spin of a assembly 28 by lowering the center of gravity of the rotating parts with little negative impact on the torque required to rotate a assembly 28 because this added mass is close to the axis of rotation. The distance between the top of a cup bearing 38 and the top of a evacuated hollow volume 26 directly above it, along the central axis of a vessel 20 is too small to allow a cup bearing 38 to become dislodged from its central position when a vessel 20 is jostled or tipped. A axial shaft 40 is made of a durable, low friction material such as stainless steel however a jeweled tip on another type of material or a different material can be used and the choice of materials is not limited to stainless steel.

The vessel shown in embodiment of FIGS. 1 and 2 also provides a benefit relative to the thermal insulation of a vessel 20 contents due to the insulation effect of a evacuated hollow volume 26.

A condensed outline for fabricating and assembly of the embodiment illustrated in FIGS. 1 and 2, helps to understand the present invention and is presented here:

1) Make a paddlewheel radiometer assembly 28 by symmetrically joining the rectangular vanes 30 around their concentrically located holes so that the black surfaces of the vanes 30 face the same rotational direction and the vanes 30 are uniformly distributed around the 360 degree diameter of a assembly 28. Press-fit a assembly 28 onto a cup bearing 38.

2) Place the two component glass parts that will become a completed vessel 20, a axial shaft 40 and a assembly 28 (with a cup bearing 38 attached) in front of you.

3) Mount a axial shaft 40 vertically, with its pointed end up, in the center of the lower component part of the two part structure that will become a vessel 20.

4) Place a cup bearing 38 on a axial shaft 40 so that the cup bearing 38 and assembly balances on a axial shaft 40.

5) Set the upper component part, of the two parts that will become a complete vessel 20, on top of the lower component part so that they are concentric and then permanently join the two parts by gently melting the edges of the upper and lower component parts of a vessel 20 along the common circumferences at which they are in contact.

6) Attach a vacuum pump to the vent tube that has been provided in the lower part of a vessel 20 and pump out the majority of the atmospheric gas from a evacuated hollow volume 26 in a vessel 20.

7) With a vacuum still applied to a evacuated hollow volume 26 by a vacuum pump, melt soften the vent tube that was used to exhaust the gas from a evacuated hollow volume 26 and pinch the melted material so that it hermetically seals a evacuated hollow volume 26 from the external atmosphere when it hardens.

Figure 3:
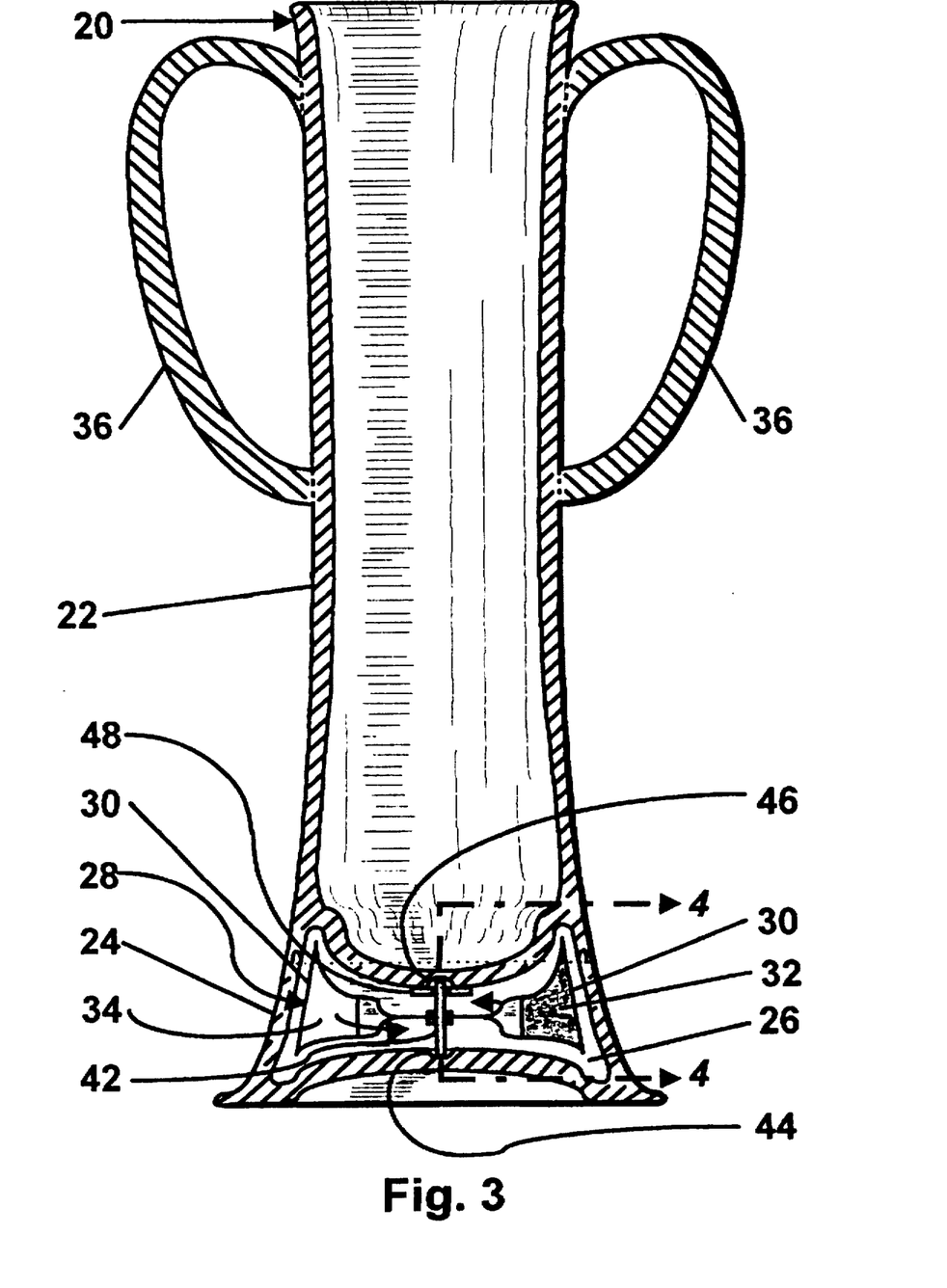
FIG. 3 shows a cross-sectional view of a vase with a radiometer included within an evacuated hollow volume in its side wall and bottom.
Figure 4:
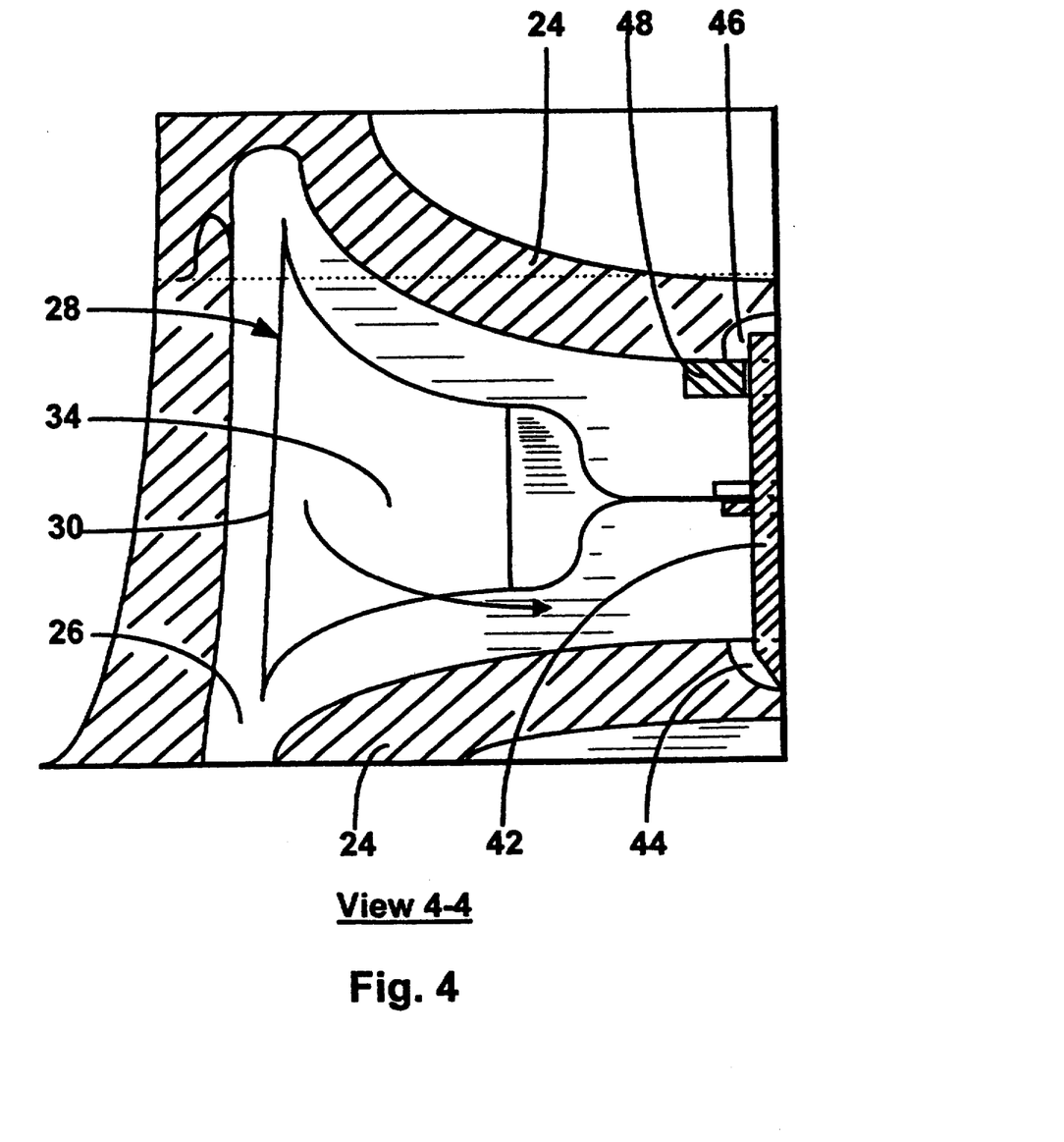
FIG. 4 shows a more detailed view the lower portion of the vase of FIG. 3, indicated by view lines 4—4, that includes a spindle as the hub for the assembly, in its axial center.

Description—FIGS. 3 and 4

A second typical embodiment of the present invention is a vessel 20 in the form of a vase, with radiometer included within its structure. This embodiment is illustrated in FIG. 3 (cross sectional view) and FIG. 4 (detailed cross section side view of the lower portion of FIG. 3). The two principle items in this embodiment are a vessel 20 and the radiometer. The principle difference between this embodiment and the embodiment described in FIGS. 1 and 2, is that this embodiment utilizes a different means for axially supporting a paddlewheel radiometer assembly 28. The assembly 28 in this embodiment is centrally attached to a hub in the form of a spindle 42 which rotates with a assembly 28. A spindle 42 is needle shaped with its sharp end pointing downward and has a circumferential rim on its length to support and align a assembly 28 when it is attached to a spindle 42. A spindle 42 type of support is more effective than a cup bearing 38 type of support when the center of gravity of a assembly 28 is high relative to the height of a evacuated hollow volume 26 at the central axis of a vessel 20. The shape of the vanes 30 for use in applications; where the vanes 30 extend into the side wall 22 of the vessel 20, is modified to extend upward into the side wall 22. When the center of gravity of a assembly 28 is too high for effective use of a cup bearing 38, described in the previous embodiment of FIGS. 1 and 2, a spindle 42 method of support is used. A reason for having the center of gravity of a assembly 28 high is the selection of a radiometer design in which the vanes 30 extend upwards into a side wall 22 portion of a evacuated hollow volume 26 of a assembly 28 thus raising the center of gravity of a assembly 28.

A vessel 20, for the embodiment shown in FIGS. 3 and 4, is fabricated and assembled in a similar way to that shown in the embodiment presented in FIGS. 1 and 2 except that its shape is different owing to its intended use as a vase. Provisions is also made on the upper and lower surface of a evacuated hollow volume 26 along the central axis of a vessel 20 to allow a spindle 42 to nest in a dimple provided in each surface. A top dimple 46 and a bottom dimple 44 entrap a spindle 42 so that it remains centrally located along the central axis of a vessel 20 within a evacuated hollow volume 26 even when a vessel 20 is jarred or tipped. The entrapment is loose and does not restrain a assembly 28 and spindle 42 from rotating. A spindle 42 for the embodiment of FIGS. 3 and 4 is made of stainless steel however the choice of materials in not limited to stainless steel. A jewel located at the base of a spindle 42 would help to reduce friction and should be used when appropriate to the specific vessel 20 design. In order to reduce the friction that would exist within a top dimple 46 when a spindle 42 is tipped to one side while rotating, a bearing 48 is provided around a spindle 42 in the area around a top dimple 44. A bearing 48 should be inexpensive, small and provide both low friction and long life. For the purpose of describing this embodiment, a bearing 48 is a small rectangular piece of thin glass with a smooth round hole in its center. The diameter of the hole is slightly larger than the diameter of a spindle 42.

The type of bearing 48 is not limited to this type of slip bearing 48 or to glass as the type of material or to any type of bearing 48 design or material. A bearing 48 is horizontally attached to the surface of a evacuated hollow volume 26 around a top dimple 44 and the top end of a spindle 42 goes through the hole in the card shaped slip bearing 48. A bearing 48 prevents sideways displacement of the upper portion of a spindle 42 while a top dimple 46 and bottom dimple 44 keep a spindle 42 in place along the central axis of a vessel 20. A bottom dimple 44 is shaped so that the force of gravity will pull the lower pointed end of a spindle 42 to the center of a bottom dimple 44 as a spindle 42 and assembly 28 rotate. A bottom dimple 44 may also include a jewel insert to further reduce friction.

The process for fabricating and assembly 28 of the embodiment illustrated in FIGS. 3 and 4 is similar to that of the embodiment described in FIGS. 1 and 2 except that a spindle 42 that is attached to a assembly 28 would be fitted between a top dimple 46 and bottom dimple 44 while surrounded by a bearing 48 when a spindle 42 and assembly 28 is installed in the hollow volume prior to the permanent joining of the two component parts that comprise a vessel 20.

Figure 5:
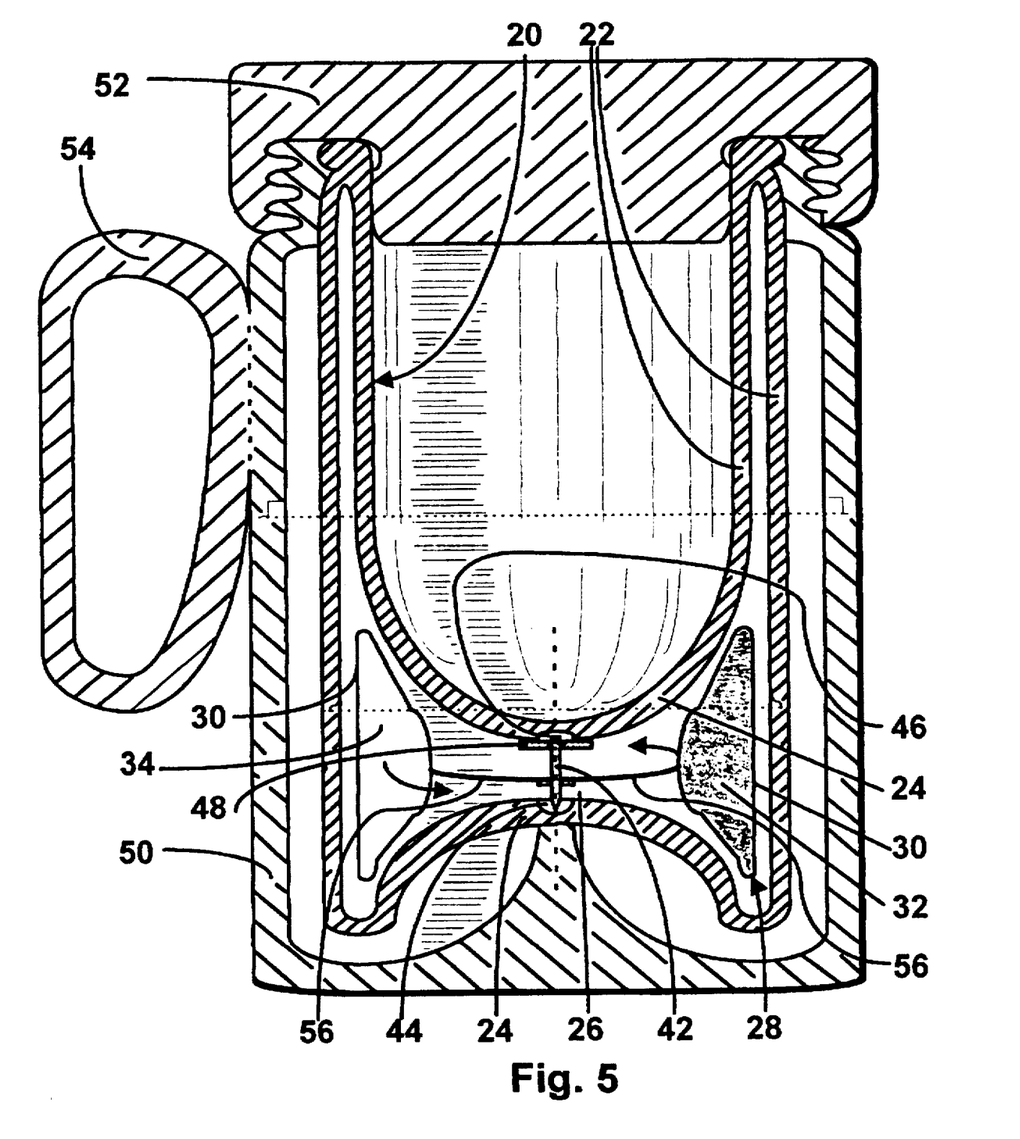
FIG. 5 shows a cross-sectional view of a vessel used as a portable sealed food container that contains a radiometer in its side wall and bottom.

Description—FIG. 5

A third typical embodiment of the present invention is a vessel 20 in the form of an insulated portable food container with a paddlewheel radiometer included within its structure as illustrated in FIG. 5 (cross sectional view). The two principle items in this embodiment are a vessel 20 and the radiometer. The principle difference between this embodiment and the embodiment described in FIGS. 3 and 4, is that this embodiment utilizes a shell 50 surrounding a vessel 20 and a cover 52 for sealing a vessel 20. A shell 50 and cover 52 protect a vessel 20 from mechanical shock when a vessel 20 is used to transport its contents and a cover 52 hermetically seals in the contents of a vessel 20. This embodiment also includes separate spokes 56 that attach to a spindle 42 hub at one end and one or more vanes 30 along and at the other end. The vanes 30 or spokes 56 may be attached to a annular collar that snap-fits or otherwise connects to the hub on which a assembly 28 rotates. It is easiest to utilize vanes 30 by themselves, directly attached to a spindle 42, or annular collar on a spindle 42, but for weight considerations the use of separate spokes 56 is sometimes appropriate and particularly when vanes 30 extend into a portion of a evacuated hollow volume 26 within a side wall 22 of a vessel 20. Spokes 56 are made from aluminum in this embodiment however their construction is not limited to this material. A shell 50 and cover 52 are made from rugged material such as plastic but its construction is not limited to this material. A shell 50 is made from transparent material in the areas where light would need to shine through a shell 50 in order to shine on the paddlewheel radiometer vanes 30.

A vessel 20 such as shown in the embodiment of FIG. 5 is fabricated and assembled in a similar way to that of the embodiment presented in FIGS. 3 and 4 except that its shape is different owing to its intended use as a portable food or beverage container. When a vessel 20 with a radiometer contained in its structure is completed, the upper piece of a two section shell 50 would be permanently attached to the outer mouth area of a vessel 20. The preferred attachment method for joining the upper section of a shell 50 to a vessel 20 is to mold it in place using plastic injection molding as the attachment technique which would shape and form the upper section of a shell 50 at the time of it's attachment to a vessel 20. A shell 50 could be bonded or attached to a vessel 20 in some other fashion and the attachment method is not intended to be limited to plastic injection molding. This upper section of the two part shell 50 surrounds the upper portion of a vessel 20 and provides for attachment of the lower portion of the two piece shell 50 at its lower rim circumference. After attachment of the upper portion of a shell 50 to a vessel 20, the lower section of a shell 50 is permanently attached to the upper portion of a shell 50. The preferred method of attachment is to use sonic welding of the two piece shell 50 if a shell 50 materials are plastic but the attachment technique is not limited to this method. With the upper and lower portions of a shell 50 permanently bonded together, a shell 50 completely protects a vessel 20 from outside mechanical shock except for the area around a vessel 20 mouth. The upper section, of the two sections comprising a shell 50, is made to include a male threaded section around the outer mouth of a vessel 20 so that a cover 52 with a mating female thread can be screwed onto a shell 50. Attachment of a cover 52 to a shell 50 hermetically seals a vessel 20 contents in a vessel 20. For ease of carrying, the container has a carrying handle 54 molded onto one of the pieces that comprise a shell 50 of the container.

Operation—FIGS. 1 and 2

This invention performs the ubiquitous function of a vessel 20; containing its contents within it's side wall 22 and bottom 24 with handles 36 to facilitate holding a vessel 20. In addition, this invention includes a paddlewheel radiometer in a evacuated hollow volume 26 within the structure of a vessel 20 which is believed to operate as described in the following paragraphs.

A evacuated hollow volume 26 within a bottom 24 or bottom 24 and side wall 22 of a vessel 20 is centrally located around the central axis of a vessel 20. This evacuated hollow volume 26 provides the space in which the radiometer portion of the invention is located. A evacuated hollow volume 26 has been evacuated of the vast majority of gasses. The largest part of the radiometer is the assembly 28. A assembly 28 consists of vanes 30 that are mounted to a central hub or vanes 30 on spokes 56 that are attached to a central hub. A number of vanes 30 are contained in a assembly 28 with the vanes 30 radiating outward from the central axis of a vessel 20. The vanes 30 have a black light absorbing surface 32 on one side and a white or mirrored light reflective surface 34 on the other side. The vanes 30 are arranged so that each have their light absorbing surface 32 facing the same rotational direction. The vanes 30 surfaces are in line with a radius of a vessel 20 and parallel with the central axis of a vessel 20. In the embodiment shown in FIGS. 1 and 2, a cup bearing 38 is provided to act as the hub for a assembly 28 and to provide the area for attaching to and supporting a assembly 20 as it rotates with the hub. A axial shaft 40 for centrally supporting the mass of a assembly 28 and cup bearing 38, along the central axis of a vessel 20, is provided so that a assembly 28 can turn freely when light shines on it. A side wall 22 and bottom 24 of a vessel 20 are made from materials that are transparent to light in the areas surrounding a paddlewheel radiometer assembly 28.

In a well lighted environment, a radiometer assembly 28 will begin to spin faster and faster as the vacuum in its evacuated hollow volume 26 becomes better, down to a pressure below which the speed of spin will reduce until a pressure is reached where the number of rarefied gas molecules hitting the vanes 30 is insufficient to overcome the frictional forces of the radiometer and it will not turn. In setting the level of vacuum for a evacuated hollow volume 26 it is necessary to consider the rate of gas leakage into the system over time, the out-gassing characteristics of the materials used to construct a radiometer assembly 28 (particularly the black and white or mirrored surfaces of the vanes 30), and the expected design life for a vessel 20 with radiometer contained in its structure.

In the embodiment shown in FIGS. 1 and 2, a assembly 28 and a cup bearing 38 turn when light or heat is radiated to or away from the vanes 30 surfaces. This is accomplished due to the difference in the efficiency of energy absorption of radiant energy, such as heat and light, between the light absorbing surface 32 of the black vanes 30 surfaces and that of the light reflective surface 34 of the white or mirrored vanes 30. Because a light absorbing surface 32 absorbs more radiant energy than a light reflective surface 34, each vanes 30 black side is warmer than it's white or mirrored side. The temperature difference between the two broad surfaces of the vanes 30 provides the mechanism for rotation therefore the thermal conductivity of the vanes 30 and the layers of reflective and absorptive coatings should be chosen so that their thermal conductivity are as low as possible while considering the other desired parameters of a assembly 28. The difference in temperature between the two surfaces of a vane cause the rarefied gas molecules, in a evacuated hollow volume 26, that strike the vanes 30 surfaces to absorb more energy when they strike the warmer light absorbing surface 32 than the cooler light reflective surface 34. Because the gas molecules that strike the light absorbing surface 32 of the vanes 30 absorbed more heat energy than the gas molecules that strike a light reflective surface 34, they rebound at a greater velocity from a light absorbing surface 32. The law of conservation of momentum requires that each action have an equal and opposite reaction therefor the force of the rebounding gas molecules on the vanes 30 is greater on a light absorbing surface 32 than a light reflective surface 34. Due to the orientation of the vanes 30 surfaces and the resulting torque on the vanes 30, caused by the rebounding gas molecules, a assembly 28 and cup bearing 38 will rotate with the white, or mirrored, surface being the advancing surface during the rotation of the vanes 30 and cup bearing 38. Because there is very little resistance to the movement of a assembly 28 by the remaining very rarefied gas in a evacuated hollow volume 26 and because the friction between a cup bearing 38 and a axial shaft 40 is very small, a assembly 28 and cup bearing 38 are free to rotate when light shines on the vanes 30.

If the temperature of the environment surrounding a evacuated hollow volume 26 is low, relative to the temperature of the vanes 30 and rarefied gasses in a evacuated hollow volume 26, the direction of rotation can reverse and the advancing surface of the vanes 30 will be the black surfaces.

An alternative possible explanation for the operation of the paddlewheel radiometer suggests that the molecules of the rarefied gas within a evacuated hollow volume 26 absorb the energy provided by the radiation shining on them from outside the vessel 20 and in striking the vanes 30 surfaces give up their energy to the vanes 30 such that they give up more energy to the black surfaces than the white or mirrored surfaces thus driving a radiometer assembly 28 to spin with its black surface trailing the white of mirrored vanes 30 surface.

Operation—FIGS. 3 and 4

In the embodiment of FIGS. 3 and 4, the explanation for the rotation of a assembly 28 are the same as noted above for the FIGS. 1 and 2 embodiment with the exception of the method for supporting a assembly 28 so that it can rotate. In the embodiment of FIGS. 3 and 4, a assembly 28 is attached to a spindle 42 which is loosely contained between two dimples in a evacuated hollow volume 26 along the central axis of a vessel 20. A spindle 42 provides the hub for the attachment of the vanes 30 of a assembly 28 and is the axle on which a assembly 28 rotates. The lower end of a spindle 42 is pointed and due to the force of gravity, slides to the lower part of the conical shaped bottom dimple 44 which is located on the lower part of a evacuated hollow volume 26 on the central axis of a vessel 20. The upper end of a spindle 42 is loosely constrained within a top dimple 46 which is located on the upper part of a evacuated hollow volume 26 on the central axis of a vessel 20. The dimples restrain a spindle 42 and a assembly 28 mounted on a spindle 42 so that it remains loosely held in place about the central axis of a vessel 20. A bearing 48 is located on the upper surface of a evacuated hollow volume 26 around a top dimple 46. A bearing 48 surrounds a spindle 42 and constrains it to be even more in line with the central axis of a vessel 20 than the dimples by themselves would. A bearing 48 with a smooth low friction surface holds a spindle 42 in a vertical orientation so that it does not touch the surface of a top dimple 46 when a assembly 28 and spindle 42 rotate. By maintaining a spindle 42 in a vertical orientation and having it avoid contact with the surface of a top dimple 46 the frictional forces can be minimized as well as helping to provide a greater rotational stability for a spindle 42 and assembly 28 by limiting the angle at which a spindle 42 can tip or precess when it is spinning. In FIG. 3 and 4, a simple rectangular card shaped piece of thin glass with a central smooth round hole, to accept a spindle 42, is utilized for a bearing 38.

The reason for choosing a spindle 42 rather than a cup bearing 38 as the central hub for a assembly 28 is the location of the center of gravity of a assembly 28 relative to the point at which the mass of a assembly 28 and hub is supported at a non-rotating point along the central axis of a vessel 20. In the case where the center of gravity for a assembly 28 is well below the point where a cup bearing 38 would rest on a axial shaft 40, the use of a cup bearing 38 type of hub is appropriate and less difficult to implement than a spindle 42 type of hub. An assembly 28 with a center of gravity well below the point for supporting a assembly 28 and hub mass will spin in a stable manner utilizing a cup bearing 38 for the hub and its stability is akin to the stability of a right angle cone that is setting on its broad round base. An assembly 28 with a center of gravity close to or above the point for supporting the mass of a assembly 28 and hub mass, will not remain stable when spinning utilizing a cup bearing 38 for the hub and its stability is akin to the stability of a right angle cone balancing on its point. When a spindle 42 type of hub is used to attach to vanes 30, or spokes 56 that are attached to vanes 30, a assembly 28 and hub is constrained to stay upright even with its high center of gravity and the loose entrapment between the dimples is further aligned by a bearing 48. The use of a spindle 42 and bearing 48 arrangement results in more friction than the use of a axial shaft 40 and cup bearing 38 arrangement however a spindle 42 and bearing 48 arrangement does allow for a higher center of gravity for a assembly 28 therefor vanes 30 of a assembly 28 can extend into a portion of a evacuated hollow volume 26 in a side wall 22 of a vessel 20.

Operation—FIG. 5

In the embodiment shown in FIG. 5, the operation of the radiometer portion is as previously described in the operation description for the embodiment shown in FIGS. 3 and 4. The FIG. 5 embodiment, includes a outer protective shell 50, a cover 52 and a carrying handle 54 that facilitate a vessel 20 being used to transport its contents. A shell 50 is attached to a vessel 20 at the top of a vessel 20 and supports a vessel 20 at its bottom 24 so that a vessel 20 is insulated from physical shock. A shell 50 is made from transparent material in the area around a assembly 26 so that light and heat can shine on the vanes 30 of a assembly 28. A shell 50 and cover 52 are made so that they can be mated to provide a full hermetic closure for a vessel 20. A carrying handle 54 is provided to use in holding a shell 50 and vessel 20 for both transportation and for holding a shell 50 and vessel 20 while filling and emptying a vessel 20 of its contents.

The embodiment of FIG. 5 also includes spokes 56 that are used to extend the vanes 30 radially and to attach to the central hub. Spokes 56 are used when the weight or angular momentum of a assembly 28 can be reduced by employing spokes 56, rather than modified vanes 30 which included radial extensions suitable for attaching vanes 30 to the central hub. The use of spokes 56 is also suited for applications where the thermally active vane portion of a assembly 28 must be located in the extreme outer portion of a hollow volume 29 in order to receive sufficient heat and light radiation to cause assembly 28 rotation when exposed to light.

When using the embodiment shown in FIG. 5, the contents of a vessel 20 is thermally insulated from the outside environment by; a side wall 22 and a bottom 24; a evacuated hollow volume 26 portion of a vessel 20 structure; the air space between outer vessel surface and the shell 50; a shell 50; and a cover 52. This layered composite insulation allows for a vessel 20 in the embodiment of FIG. 5 to be used as a dewar which will help a vessel 20 contents retain its temperature. A silvered coating of a portion of the surface of a evacuated hollow volume 26 can help to reduce heat loss while not adversely effecting the function of the paddlewheel radiometer. This further helps the embodiment of FIG. 5 to perform the function of a dewar.

SUMMARY, RAMIFICATIONS AND SCOPE

Thus the reader will see that the vessel with radiometer contained in its structure of the invention, provides a useful container for a wide variety of uses and includes a unique dynamic movement when light shines on it. This type of novel combination of the radiometer with a common household vessel sets the vessel of this invention dramatically apart from the thousands of vessel designs that an individual might have previously experienced in his or her life time. The uniquely animated aspect of the invention makes it more attractive, for many uses, than its unanimated equivalent. This uniqueness and enhanced attention getting qualities will certainly result in this invention being a tool in advertising, sales and marketing. In addition there is the purely individual personal motivation of people to have a vessel that can provide some bemusement, entertainment or to act as a conversation piece.

While the above description contains many specificities, these should not be construed as limitations on the scope of the invention, but as exemplification of some of the embodiments of the invention. Many other variations are possible for example; the use of the invention, made from plastic, as a cup for a baby would provide an "attention getter" for the baby just due to the movement of the paddlewheel assembly that the baby could cause by moving the vessel in addition to its rotation when placed in a well lighted environment. The invention could also be utilized in a container used for brewing 'sun tea', which is tea that is brewed by letting the tea steep in water in a transparent vessel heated by sun shine. The invention could also be utilized in a naturally well lighted, or electrically lighted fish bowl, to attract the attention of the viewer and make the total fish bowl environment more animated. The invention could also be utilized as a glass type of container such as soft drinks or iced tea might be served in, which would periodically be placed in a well lit environment when used so the paddlewheel radiometer in its base would spin.

Accordingly, the scope of the invention should be determined not by the embodiments illustrated, but by the appended claims and their legal equivalents.

I claim:

1. A vessel, comprising: a side wall, said side wall being suitably transparent, a bottom, said bottom being suitably transparent, joining means for joining said side wall and said bottom, a evacuated hollow volume suitably within the joined structure of said side wall and said bottom, said evacuated hollow volume being substantially coin shaped within said bottom of said vessel and substantially cylindrically shaped in said side wall of said vessel, said evacuated hollow volume being suitably evacuated of gas and suitably concentric with the central axis of said vessel, a assembly within said evacuated hollow volume, a plurality of vanes in said assembly, said vanes radiating outward from the central axis of said vessel, said vanes having a light absorbing surface on one side and a light reflective surface on the other side, said vanes arranged such that all have said light absorbing surfaces facing the same rotational direction, said vanes surfaces are substantially in line with a radius of said vessel and substantially parallel with the central axis of said vessel, the axial means for pivotably supporting the mass of said assembly on another surface along the central axis of said vessel, whereby light shining on said vanes will result in said assembly spinning thus providing animation within what is normally a static object.

2. The vessel of claim 1 wherein said bottom contains said evacuated hollow volume.

3. The vessel of claim 1 wherein said side wall and said bottom jointly contain said evacuated hollow volume.

4. The vessel of claim 1 further including one or more handles suitably attached to the outer surface of said side wall.

5. The vessel of claim 1 further including a cup bearing, said cup bearing being centrally attached to said assembly and providing a axial means on which said assembly is balanced in a substantially horizontal orientation, additionally including a needle shaft, said cup bearing is pivotably balanced on the sharp end of said needle shaft which is suitably mounted on the lower surface of said evacuated hollow volume in a substantially vertical orientation along the central axis of said vessel, said assembly is constrained to stay centrally located around said axial shaft by predetermined selection of the length of said axial shaft and predetermined selection of a clearance space between the top of said cup bearing and the surface of said evacuated hollow volume above said axial shaft so that said assembly can rotate while constrained to remain substantially concentric with the central axis of said vessel.

6. The vessel of claim 1 further including a spindle, said spindle being centrally attached to said assembly and providing the axial means on which said assembly is pivotably balanced in a substantially horizontal orientation, additionally including a top dimple, a bottom dimple and a bearing, said spindle being of predetermined length and suitably pivotably retained between said bottom dimple and said top dimple, said bottom dimple is located at the bottom surfaces of said evacuated hollow volume along the central axis of said vessel, said top dimple is located at the top surfaces of said evacuated hollow volume along the central axis of said vessel, said assembly weight is pivotably supported on the surface of said bottom dimple on the point of said spindle and maintained in a substantially vertical orientation by said bearing suitably mounted on the top surface of said evacuated hollow volume around said top dimple.

7. The vessel of claim 1 further including a shell, said shell being suitably transparent and surrounding said side wall and said bottom of said vessel, additionally including a cover, said shell suitably provides for the attachment of said cover in order to completely seal in the contents of said vessel when said cover is put on said shell of said vessel.

8. The vessel of claim 7 further including one or more carrying handle suitably attached to said shell.

9. A vessel, comprising: a side wall, said side wall being suitably transparent, a bottom, said bottom being suitably transparent, said bottom including a evacuated hollow volume, said evacuated hollow volume being substantially coin shaped and concentric with the central axis of said vessel, said evacuated hollow volume being suitably evacuated of gas, a joining means for joining said side wall and said bottom, a assembly concentrically centered along the central axis of said vessel within said evacuated hollow volume, said assembly having a plurality of vanes that radiate outward from the central axis of said vessel, said vanes having a light absorbing surface on one side and a light reflective surface on the other side, said vanes arranged such that each has said light absorbing surface facing the same rotational direction, said vanes surfaces substantially coincident with a radius of said vessel and substantially parallel with the central axis of said vessel, a axial means for supporting the mass of said assembly on another surface along the central axis of said vessel, whereby light shining on said vanes will result in said assembly spinning thus providing animation in a normally static object.

10. The vessel of claim 9 further including one or more handles suitably attached to said side wall.

11. The vessel of claim 9 further including a cup bearing, said cup bearing being centrally attached to said assembly and providing the axial means on which said assembly is pivotably balanced in a substantially horizontal orientation, additionally including a axial shaft, said cup bearing is pivotably balanced on the sharp end of said axial shaft which is suitably mounted in a substantially vertical orientation on the lower surface of said evacuated hollow volume along the central axis of said vessel, said cup bearing is constrained to stay centrally located around said axial shaft by predetermined selection of the length of said axial shaft and the predetermined selection of the clearance distance between the top of said cup bearing and the top of said evacuated hollow volume above said axial shaft.

12. The vessel of claim 9 further including a spindle, said spindle being centrally attached to said assembly and providing the axial means on which said assembly is pivotably balanced in a substantially horizontal orientation, additionally including a top dimple, a bottom dimple and a bearing, said bottom dimple is located at the lower surface of said evacuated hollow volume along the central axis of said vessel, said top dimple is located at the top surface of said evacuated hollow volume along the central axis of said vessel, said spindle is suitably pivotably sandwiched between said top dimple and said bottom dimple, said assembly weight is transferred from the lower end of said spindle to the surface of said bottom dimple, said spindle is maintained in a substantially vertical orientation by said bearing suitably mounted on the top portion of said evacuated hollow volume in the area around said top dimple.

13. The vessel of claim 9 further including a shell, said shell being suitably transparent and suitably attached to said side wall and said bottom of said vessel, additionally including a cover, said shell provides for the suitable hermetic attachment of said cover to completely seal in the contents of said vessel when said cover is attached to said shell.

14. The vessel of claim 13 further including one or more carrying handles attached to said shell.

15. A vessel, comprising: a side wall, said side wall being suitably transparent, a bottom, said bottom being suitably transparent, a suitable joining means for joining said side wall and said bottom, said bottom having a hollow volume extending uniformly and concentrically up into a hollow volume within a suitable portion of said side wall of said vessel so that the hollow volume of said side wall and the hollow volume of said bottom are contiguous and concentric with the central axis of said vessel and form a evacuated hollow volume, said evacuated hollow volume being substantially coin shaped within said bottom of said vessel and substantially cylindrically shaped within said side wall of said vessel, said evacuated hollow volume being suitably evacuated of gas, a assembly centrally located in said evacuated hollow volume of said vessel, a plurality of spokes suitably included in said assembly, said assembly being pivotably retained along the central axis of said vessel, said spokes radiating outward from the central axis of said vessel within said evacuated hollow volume, a plurality of vanes suitably included on said assembly, said spokes each having one or more of said vanes suitably attached, said vanes each having a light absorbing surface on one side and a light reflective surface on the other side, said vanes arranged such that each has said light absorbing surface facing the same rotational direction, said vanes surfaces substantially coincident with a radius of said vessel and substantially parallel with the central axis of said vessel, a axial means for pivotably supporting the weight of said assembly on another surface along the central axis of said vessel, whereby light shining on said vanes will result in said assembly spinning thus providing animation in a normally static object.

16. The vessel of claim 15 further including one or more handles attached to said side wall.

17. The vessel of claim 15 further including a cup bearing, said cup bearing centrally attached to said assembly and providing the axial means on which said assembly is pivotably balanced in a substantially horizontal orientation, additionally including a axial shaft, said cup bearing is pivotably balanced on the top end of said axial shaft which is suitably mounted in a substantially vertical orientation on the lower surface of said evacuated hollow volume along the central axis of said vessel, said cup bearing is constrained to stay centrally located around said axial shaft by predetermined selection of the length of said axial shaft and the predetermined selection of the distance between the top of said cup bearing and the top of said evacuated hollow volume above said axial shaft.

18. The vessel of claim 15 further including a spindle, said spindle being centrally attached to said assembly, said spindle providing the axial means on which said assembly is pivotably balanced in a substantially horizontal orientation, additionally including a top dimple, a bottom dimple and a bearing, said spindle is suitably pivotably sandwiched between said top dimple and said bottom dimple, said bottom dimple is located at the lower surface of said evacuated hollow volume along the central axis of said vessel, said top dimple is located at the top surface of said evacuated hollow volume along the central axis of said vessel, said assembly weight is pivotably transferred from the lower end of said spindle to the surface of said bottom dimple, said spindle is maintained in a substantially vertical orientation by a suitable bearing suitably mounted on the top portion of said evacuated hollow volume around said top dimple.

19. The vessel of claim 15 further including a shell, said shell being suitably transparent, said shell surrounding said sides and said bottom, additionally including a cover, said shell provides for the suitable attachment of said cover to completely seal in the contents of said vessel when said cover is attached to said shell.

20. The vessel of claim 19 further including one or more carrying handle attached to said shell.

* * * * *

UNITED STATES PATENT AND TRADEMARK OFFICE
CERTIFICATE OF CORRECTION

PATENT NO. : 5,739,903
DATED : April 14, 1998
INVENTOR(S) : Erl E. Kepner

It is certified that error appears in the above-identified patent and that said Letters Patent is hereby corrected as shown below:

The Drawing Sheets 1 and 4 should be deleted to be replaced with Sheets 1 and 4, consisting of Figs. 1 and 4, as shown on the attached pages.

Signed and Sealed this

Twenty-third Day of June, 1998

Attest:

BRUCE LEHMAN

*Attesting Officer*      *Commissioner of Patents and Trademarks*

Fig. 1

View 4-4

Fig. 4